March 19, 1968  J. BRAMLEY  3,374,393
INTENSE INCOHERENT LIGHT SOURCE OBTAINED BY QUENCHING
THE HIGHER EXCITED STATES AND CONCENTRATING
THE ENERGY ON THE LOWER STATES
Filed Feb. 12, 1965
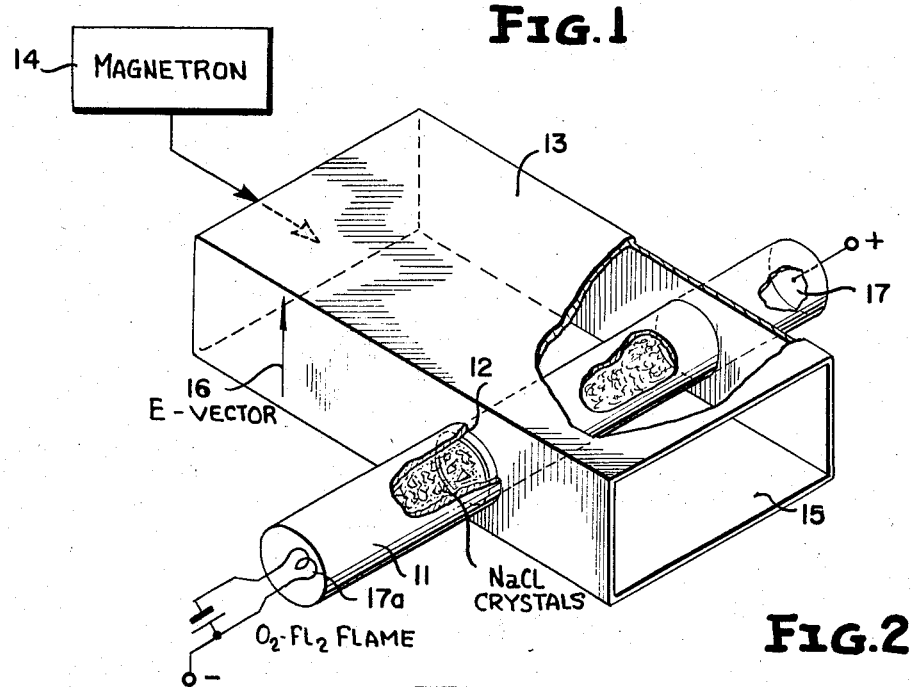
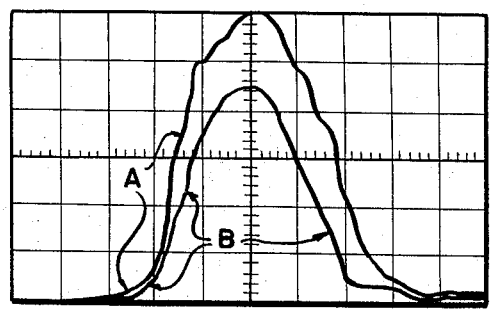
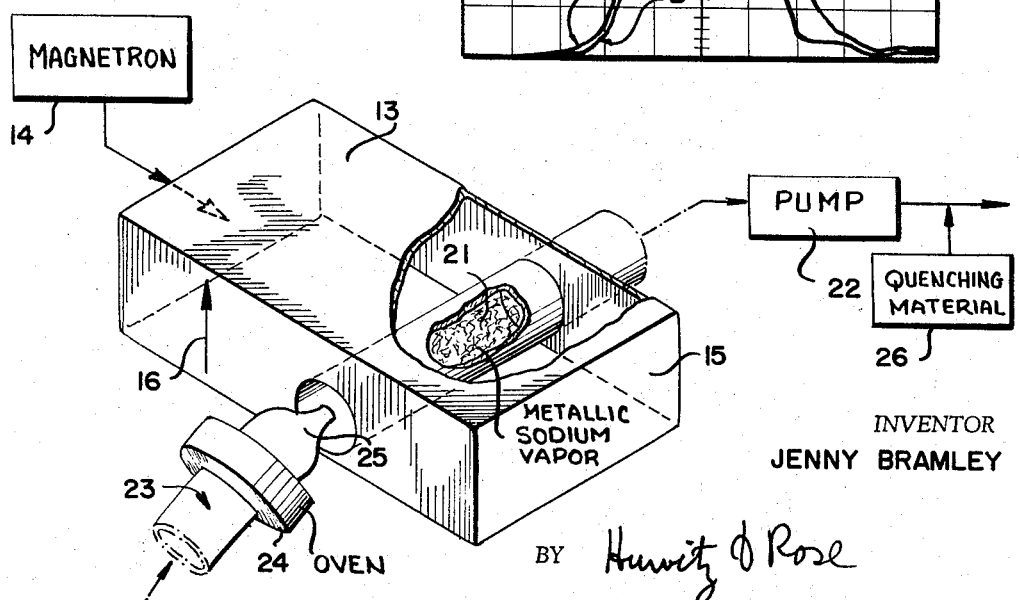
INVENTOR
JENNY BRAMLEY
BY Hurwitz & Rose
ATTORNEYS

United States Patent Office 3,374,393
Patented Mar. 19, 1968

3,374,393
INTENSE INCOHERENT LIGHT SOURCE OBTAINED BY QUENCHING THE HIGHER EXCITED STATES AND CONCENTRATING THE ENERGY ON THE LOWER STATES
Jenny Bramley, Falls Church, Va., assignor to Melpar, Inc., Falls Church, Va., a corporation of Delaware
Filed Feb. 12, 1965, Ser. No. 432,149
14 Claims. (Cl. 315—39)

ABSTRACT OF THE DISCLOSURE

Emission of intense light in an appropriate region of the electromagnetic spectrum from a plasma containing a metal or compound thereof having first and further excited states is achieved by exciting the plasma using microwave energy, while quenching the higher excited states to concentrate energy in the lower excited state or states.

---

The present invention relates generally to intense incoherent light sources and, more particularly, to light sources which utilize microwave energy to trigger a plasma including a metal having lower excited states and higher excited states, in combination with a quenching agent for the higher excited states.

In experiments which I have conducted, the derivation of intense light in the visible, infrared and ultraviolet regions has been observed when a plasma including a metal or metal compound and foreign gas is subjected to a microwave field. The microwave field acts as a pumping source, which ultimately energizes molecules or atoms of the metal or compound to the lower excited state. My observations lead to the conclusion that the other higher excited states of the molecules and atoms are quenched by collisions with the foreign gas. By quenching undesired higher excited states, substantially all available energy is concentrated into the lower excited state, so that particularly intense radiation of essentially one wavelength is derived when the molecules or atoms in the lower excited state returns to the ground state.

Forrester et al. discloses the concept of efficient light excitation by microwaves in vol. 46, No. 5, pages 339–342, of the "Journal of the Optical Society of America," May 1956. In the sources disclosed by Forrester et al., however, the microwave excited plasma consists only of mercury in which very narrow lines of visible light are produced. Since transitions between the first excited and ground states of mercury result in light generation in the ultraviolet region, it follows that the phenomena observed relies upon transitions between higher order states rather than between only a lower excited state and the ground states. This is explained by the failure of Forrester, and the sources disclosed by him, to employ a quenching agent.

Since Forrester et al. use no quenching agent, the light intensity derived is considerably smaller than I have been able to derive, everything else being equal. In particular, I have been able to achieve, with microwave pumping, flame enhancement in excess of 130 times by including quenching materials in the plasma. The flame to be enhanced may be seeded with a metal, for example, capable of being excited to its first and higher states by the microwave field, and the higher state excitations are quenched, thereby concentrating the entire radiated energy in a small portion of the spectrum, and directing the entire utilization of microwave pumping energy to that end.

Investigations reveal that the great light intensity derived by means of the present system cannot be entirely due to heat energy imparted to the plasma by the microwave field. Calculations indicate that if all the microwave heat energy were absorbed by the plasma, light enhancement could not be as great, by more than an order of magnitude, as has been observed. Thus, a feature of the present invention is the efficient derivation of high intensity light.

The excited plasma may be formed, in accordance with one embodiment of the present invention, by an electric discharge. It is essential, however, that the plasma include two components, one of which emits radiation while the other serves to quench.

The basic enhancement effect appears to be due to a marked increase in population of a very limited number of levels of the emitted light, even in the infrared region, and in most cases is restricted to one level, i.e. the lowermost. It appears likely, then, that the microwave energy is imparted to that plasma component which does not emit (i.e. water vapor, hydrogen, inert gas), which in turn imparts its energy by collision to the component which does not emit, i.e. metal. I do not desire, nevertheless, to be restricted to this theory. In general, enhancement has succeeded best in plasma seeded with sodium, potassium and barium, and in general succeeds with all atoms or diatomic molecules having a large transition probability from the first excited stage to a ground state, transition from other states being quenched.

While reference is made to a first excited state, the invention is not so limited, and more than one state may be involved in producing excitation, provided that other higher states are suppressed.

In order for microwave pumping to be efficient, the electric vector of the microwave energy must have the correct orientation for absorption of energy by the plasma at the Brewster angle, for which all the energy of a primary wave of radiation can enter a second medium, when initiated in a first. Alternately, a resonant cavity may be used.

The total enhancement available, according to the invention, can be radically increased by increasing the number of excitable atoms or molecules, and/or their velocities. This is accomplished, according to a second embodiment of the invention, by ejecting heated material in vapor form from a suitable nozzle, at high pressure, into a region subject to microwave energy. In this manner a large population of atoms or molecules becomes available, having extremely high velocities, partly imparted by heating and partly by direct mechanical action.

It is accordingly, a broad object of the present invention to provide a new and improved high intensity light source of the type wherein a plasma is pumped by microwave energy, and in which excited states other than a desired state are suppressed.

Another object of the invention is to provide a high intensity light source in which metal or metal compound molecules or atoms are pumped to only their first excited state, all other states being suppressed.

A further object of the invention is to provide a high intensity light source in which heated metal is ejected at high velocity into a chamber where it may be excited by microwave energy, quenching material being added to the metal to assure light emission only from a lower excited state.

An additional object of the invention is to provide an intense light source in which a plasma is maintained in near vacuum, in a closed envelope, and in which quenching is provided by a gas or vapor subsisting in the envelope.

The above and still further objects, features and advantages of the present invention will become apparent upon consideration of the following detailed description of one specific embodiment thereof, especially when taken in conjunction with the accompanying drawings, wherein:

FIGURE 1 is a view in perspective of a first embodiment of the present invention;

FIGURE 2 is a graph illustrating pulse waveforms applied to and derived from the apparatus of FIGURE 1; and FIGURE 3 is a view in perspective of a second embodiment of the invention.

Reference is now made to FIGURE 1 wherein a plasma-containing quartz tube 11 is inserted transversely through holes 12 provided in the side walls of waveguide 13. Magnetron 14 excites waveguide 13 in the $TE_{10}$ mode with microwave energy at frequencies that are absorbed by the plasma in tube 11. Remote end 15 of wave guide 13 is open so that light energy radiated from tube 11 may be optically coupled with the exterior of the waveguide. The Brewster angle requirement is complied with to assure maximum absorption in the plasma of the microwave energy.

Tube 11 is inserted through guide 13 at a point where the standing electric wave is of optimum amplitude. The location of optimum standing wave intensity may be obtained by locating E-H plane tuners (not shown) one either side of tube 11 within waveguide 13. Typically, such tuners are of the type disclosed on pages 148 and 149 of "Electronic and Radio Engineering," Terman, 1955, McGraw-Hill Book Company, Inc. Since the longitudinal axis of tube 11 is at right angles to the electric vector 16 and the electric vector is of optimum amplitude, the greatest possible area of the plasma is exposed to the greatest electric field available in the guides. Thereby, the greatest possible influence of the microwave wave energy on the plasma is obtained.

The criteria for optimum relationship between the orientations of the electric field vector and the plasma boundaries can be calculated from standard electromagnetic theory, as set forth on page 516 of Stratton Electro-Magnetic Theory, 1941.

The plasma in tube 11 is formed by an electric discharge seeded with a suitable metal or metallic salt. It is formed by directing the discharge throughout the interior of tube 11, the latter being saturated as nearly as possible with crystals of a salt or compound that produces the desired enhancement. The plasma is formed by impressing a high voltage between an anode 17 and a heated cathode 17a located in the tube 11, on an axis thereof.

The salt, depending upon its structure, may serve two distinct functions. In the first instance, it serves as a carrier for an elemental metal that is released when the salt decomposes in response to heating of the plasma. Examples of such salts are NaCl and $Na_2CO_3$, in which cases elemental sodium is formed. The latter is pumped to its first excited state by the microwave field in waveguide 13. All halide salts formed by alkali halides can be used as carriers in this manner. It is also to be understood that elemental metals, e.g. cesium, may be placed directly in quartz tube 13 without being carried in a salt.

The salt, in certain instances, may also carry metal compounds that are formed by dissociation; examples of salts and the high temperature reactions that produce metal compounds having the requisite first excited state are:

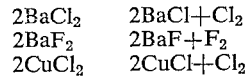

In operation, when the plasma is seeded with sodium, e.g. as derived from decomposition of NaCl, all of the usual sodium lines are generated, resulting in flame brightness of 15,000 foot-lamberts. The mechanism involves exciting sodium from the ground level to the first excited state and quenching the other states with water vapor present in the plasma.

When the output of magnetron 14 (2.45 kmc.) is pulsed at the rate of 60 times per second, the flame brightness is increased, by a factor of 130, to 2 million foot-lamberts. As each magnetron pulse is fed to guide 13, the intensity of light deriving from its open end 15 increases as a pulse, see FIGURE 2, wherein waveforms A and B are the detected magnetron and light pulses, respectively. Thus, the pulses deriving from magnetron 14 can be considered to be triggering or pumping the plasma, so that a significant portion of the sodium atoms therein are energized from the ground state to an excited state. As the excited molecules return to the ground state, many quanta of light in the yellow region are emitted to obtain the indicated enhancement of from 15,000 to 2,000,000 foot-lamberts. No appreciable enhancement of other lines has been observed.

Spectral analysis of the derived, high intensity visible light reveals that spreading of the sodium lines is very pronounced, with strong intensities over a band of about 50 Angstroms, centered at about 5890 Angstroms, in contrast with the normal strong intensity range of approximately 6 Angstroms. While light intensity precisely at the resonant lines is increased only about ten-fold, the total intensity is markedly increased because of the wider light energy bandwidth.

Spectral analysis of light output indicates that enhancement is restricted to the first excited state of sodium. My analysis indicates that the higher excited states of sodium are quenched by collisions between the excited metal and the water vapor. Quenching of the higher excited states throws additional sodium molecules into the first excited state, so that more transitions occur from the first state to ground.

Metallic cesium can be substituted for the NaCl crystals, if intense infraradiation in the ranges centered at 8500 and 8900 Angstrom unit wavelength is desired. Experiments have also indicated that metallic zinc or copper can replace the NaCl crystals if enhancement in the ultra-violet is desired. The fact that these metals do not enhance the visible spectrum, where higher order transitions occur, is evidence of the fact that only first order transitions are enhanced, with quenching of the other possible transitions.

Reference is now made to FIGURE 3 of the accompanying drawings, wherein is provided a tube 21, the outlet of which communicates with a pump 22, suitable for pumping sodium in liquid or solid powder state, to a conduit 23, at relatively high pressure. The sodium is heated in an oven 24 surrounding the conduit 23. The latter terminates in a nozzle 25, and the heat provided is sufficient to generate vaporous sodium. The nozzle then serves to eject sodium in the vapor phase into the tube 21 in copious quantities and at high velocity. Within the tube 21 the sodium vapor is subjected to irradiation by microwaves provided by pulsed magnetron 14, passing down waveguide 13.

While metallic sodium vapor is specifically referred to, in describing the system of FIGURE 3, various metals or metallic compounds can be employed, precisely as in the system of FIGURE 1.

Quenching material is inserted into the line leading from pump 22, by means of a source 26. The specific quenching material used, normally water vapor, must be chemically compatible with the metallic compound employed, as in the case of FIGURE 1. This presents no problem in the case of $BaCl_2$, $BaF_2$, $CuCl_2$, NaCl and the like, but in the case of metallic sodium it may be desirable to use an inert gas quencher.

The efficiency of conversion of magnetron output to visible or infrared light, and the intensity of output, is directly related to the total quantity of metallic ion or metallic compound which is available to be irradiated, and to the velocities of the ions, atoms, or molecules. The jet formed by nozzle 25 is arranged, by design of the nozzle, to provide intensely high velocity of flow, and a large mass of material, i.e. both mass flow and velocity are high. The oven 24 must provide heat enough to substitute for an oxy-hydrogen flame, however, the velocities which can be attained by a jet far exceed those due to available temperatures, so that one aspect of the invention is to provide excitable metallic atoms or molecules at far higher velocities than is attainable by heating alone.

In operation, the microwave field existing in waveguide 13 heats the crystals (assumed to be $BaCl_2$, in one example) to cause formation of BaCl molecules. The microwave field also heats the water vapor of alternative quenching material in the plasma so that collisions between the diatomic barium chloride and the quenching material readily occur. The existing mechanism involves pumping BaCl molecules from the ground state to the first excited state. The water vapor quenches possible excited states of BaCl other than the first excited state; specifically, the second excited state is quenched to preclude radiation in the red and ultra-violet regions. It has been found that, as a result of quenching, radiation in the green wavelength region between 5000 and 5300 Angstroms is provided to produce an approximate brightness of 100,000 foot-lamberts. If hydrated $BaCl_2$ is utilized, the need for added water vapor is obviated because sufficient water for quenching is available in the crystal.

While I have specifically disclosed only a few of the possible combinations of the various materials that can be employed, it is to be understood that many other materials can be utilized. For example, the water vapor quenching agent, in the apparatus of FIGURE 3, can be replaced with hydrogen or argon, if compounds other than BaCl or NaCl are utilized.

In general, there exists the problem of coupling microwave energy into a plasma, i.e. of assuring that the plasma will absorb the microwave energy. This problem is well understood in the art, and can be solved in various ways, of which the simplest is adopted, and consists of utilizing microwave energy above those for which the plasma is transparent, typically about 3 kmc.

While I have described and illustrated several specific embodiments of my invention, it will be clear that variations of the details of construction which are specifically illustrated and described may be resorted to without departing from the true spirit and scope of the invention as defined in the appended claims.

I claim:

1. An intense light source comprising a container of plasma including a metal or metallic compound having a first excited state and other excited states, a quenching gas included in said plasma, said quenching gas being adapted to quench said other excited states on collision with the molecules of said metal or metallic compound, and means comprising a source of electromagnetic microwave energy coupled to said plasma for exciting said plasma and said quenching gas.

2. The source of claim 1 wherein said quenching gas comprises water vapor.

3. The source of claim 1 wherein is provided an electric discharge generating means for forming said plasma.

4. The source of claim 1 wherein said plasma comprises an alkali metal and said quenching gas.

5. The source of claim 4 wherein said plasma comprises BaCl and said quenching gas comprises water vapor.

6. An intense incoherent light source comprising a waveguide, means for exciting said waveguide in a predetermined mode with microwave energy, a tube saturated with a composition including a metal having a ground state, a first excited state and other excited states, means for creating a plasma including said metal, means in said plasma to quench said other excited states, and means for coupling said energy within said waveguide to the plasma within said tube, the frequency of said microwave energy being in excess of the frequencies to which the plasma is transparent.

7. An intense incoherent light source comprising a resonant cavity, means for exciting said resonant cavity in a predetermined mode with microwave energy, an electric discharge means including an envelope having internally thereof a composition including a light emitting material having a ground state, a first excited state and other excited states, and a foreign gas capable of quenching said other excited states, means creating a plasma derived from said composition in said envelope, and means for coupling energy from said resonant cavity to the plasma within said envelope.

8. The source of claim 7 wherein said composition consists of a metallic salt.

9. The source of claim 8 wherein said said salt is selected from the alkali-halide salts.

10. The source of claim 7 wherein said composition consists of a salt carrying a metal compound formed by disassociation of the salt.

11. The source of claim 10 wherein said salt is selected from the group consisting of $BaCl_2$, $BaF_2$ and $CuCl_2$.

12. The source of claim 7 wherein said composition consists of a metal having doublet sigma ground state and a doublet pi first excited state.

13. An intense incoherent light source, comprising a source of microwave energy, a source of a composition including a metal compound having a ground state, a first excited state and at least another excited state, quenching material, means comprising a nozzle and heater for continuously supplying said composition and said material at high velocity and at high temperature as a plasma to a container therefor, said container at least partly transparent to light energy emitted from said plasma upon excitation thereof, said material being adapted to quench said at least another excited state and means for coupling energy from said source to said plasma, the frequency of said microwave energy being in excess of the frequencies to which said plasma is transparent.

14. An intense incoherent light source comprising a source of microwave energy, a tube containing a plasma having a composition including a metal or metal compound having a ground state, a first excited state and other excited states, said plasma further including a quenching gas, and means for coupling energy from said source to the plasma within said tube, the frequency of siad microwave energy being in excess of the frequencies to which the plasma is transparent so that the composition is excited to its first excited state and generates light energy as it falls back to the ground state, said quenching gas being excited during said microwave excitation so that collisions occur between said gas and the other components of said plasma to quench said other excited states.

References Cited

UNITED STATES PATENTS 3,042,829 7/1962 Humphreys _____ 315—248 X
3,048,738 8/1962 Paul _____ 313—202

JAMES W. LAWRENCE, Primary Examiner.

C. R. CAMPBELL, Assistant Examiner.